(12) United States Patent
Steenbakkers et al.

(10) Patent No.: US 7,704,014 B2
(45) Date of Patent: Apr. 27, 2010

(54) PROCESS FOR REMOVING CONTAMINANTS FROM CONTAMINATED SOIL

(75) Inventors: Laurentinus Wilhelmus Steenbakkers, Susteren (NL); Dominicus Richardus Johannes Grootjen, Sittard (NL); Lambertus Antonius Maria Panwijk, Zoelmond (NL); Martin Williem Jozef Plum, Landgraaf (NL)

(73) Assignee: Terreco Holding B.V., Geleen (NL)

( * ) Notice: Subject to any disclaimer, the term of this patent is extended or adjusted under 35 U.S.C. 154(b) by 337 days.

(21) Appl. No.: 10/582,992

(22) PCT Filed: Dec. 20, 2004

(86) PCT No.: PCT/NL2004/000887

§ 371 (c)(1),
(2), (4) Date: Jul. 16, 2007

(87) PCT Pub. No.: WO2005/058516

PCT Pub. Date: Jun. 30, 2005

(65) Prior Publication Data

US 2007/0274787 A1    Nov. 29, 2007

(30) Foreign Application Priority Data

Dec. 19, 2003    (NL)    .................................... 1025074

(51) Int. Cl.
*B09C 1/00* (2006.01)

(52) U.S. Cl. .............................. 405/128.1; 405/128.25; 405/129.57

(58) Field of Classification Search .............. 405/128.1, 405/128.15, 128.25, 129.57
See application file for complete search history.

(56) References Cited

U.S. PATENT DOCUMENTS

| | | | |
|---|---|---|---|
| 5,553,974 A | 9/1996 | Nazarian | |
| 6,547,489 B2 | 4/2003 | Plum | ...................... 405/128.45 |
| 6,742,961 B2 | 6/2004 | Plum | ...................... 405/128.45 |
| 2001/0021336 A1* | 9/2001 | Plum | ...................... 405/128.35 |

FOREIGN PATENT DOCUMENTS

| | | |
|---|---|---|
| EP | 0 429 137 | 5/1991 |
| EP | 1 134 042 | 9/2001 |

OTHER PUBLICATIONS

International Search Report

* cited by examiner

*Primary Examiner*—John Kreck
(74) *Attorney, Agent, or Firm*—Nixon & Vanderhye P.C.

(57) ABSTRACT

The invention relates to a process for removing contaminants from contaminated soil with the aid of a stripping gas. In the process a biologically active layer is present in or on the soil. The process comprises the following steps: a) there is created in the soil a medium whose resistance is lower than the resistance of the surrounding soil, b) the stripping gas is injected in the soil at the depth of and/or beneath the contaminant, c) the contaminants are volatized with the stripping gas, whereupon the stripping gas with the contaminants largely flows to the biologically active layer via the medium whose resistance is lower than the surrounding soil.

12 Claims, 1 Drawing Sheet

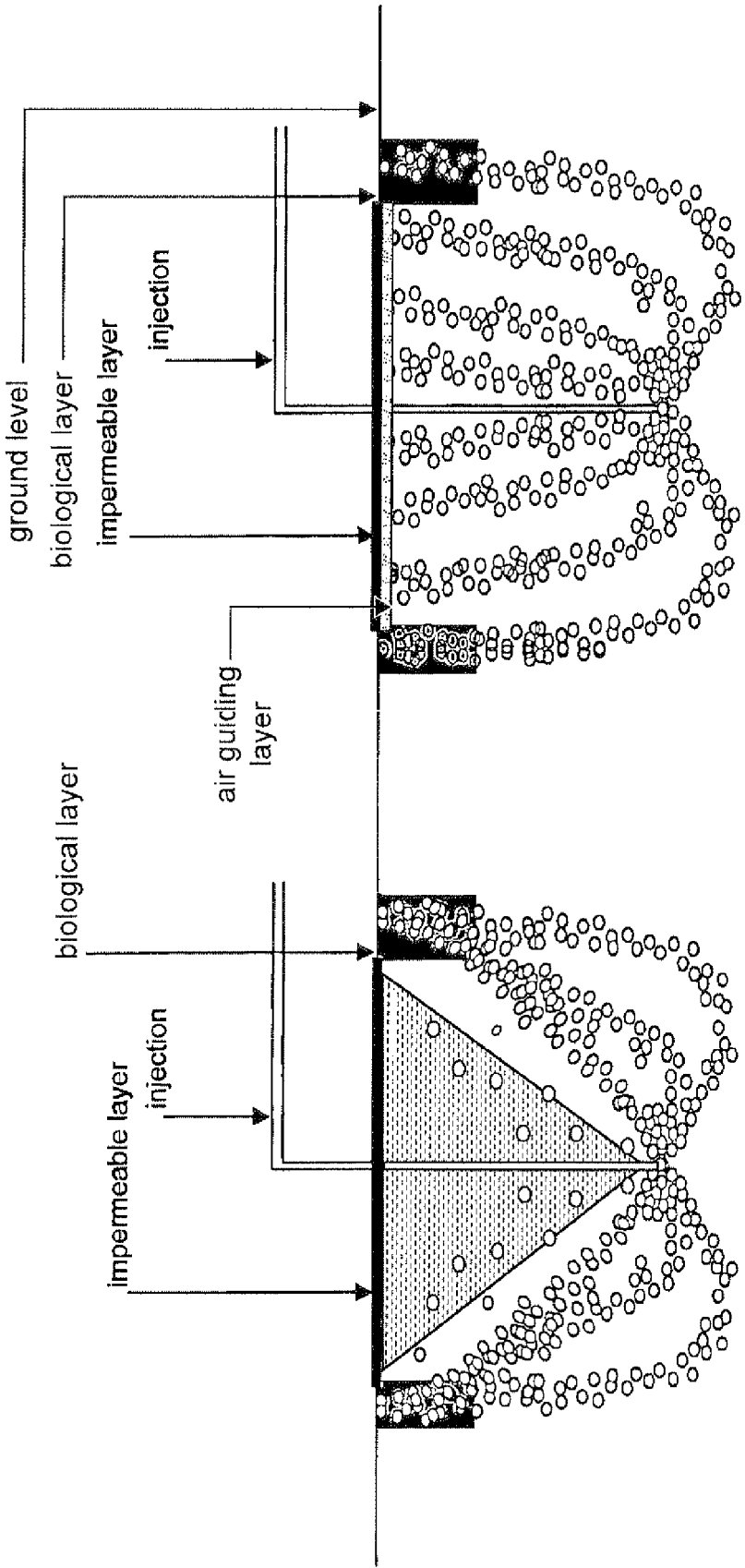

PROCESS FOR REMOVING CONTAMINANTS FROM CONTAMINATED SOIL

This application is the US national phase of international application PCT/NL2004/000887 filed 20 Dec. 2004 which designated the U.S. and claims benefit of NL 1025074, dated 19 Dec. 2003, the entire content of which is hereby incorporated by reference.

FIELD

The invention relates to a process for removing a contaminant from soil with the aid of a stripping gas and with a biologically active layer being present in or on the soil.

BACKGROUND AND SUMMARY

A process for removing contaminants from soil with the aid of a stripping gas is known from EP 0 429 137 whereby the stripping gas is injected into the soil at the depth of and/or beneath the contaminant so that the contaminant is volatized with the stripping gas and the stripping gas rises along with the contaminant to the surface above the contaminated soil. During the ascent, the stripping gas with the contaminant passes through a biologically active layer present in or on the soil.

A drawback of the known process is that the stripping gas with the contaminant does not always rise to the location where the biologically active layer is present or where a biologically active layer can be applied. EP 0429 137 describes that spreading of the stripping gas with contaminants can be prevented by providing barriers such as a water screen. Another process is known from U.S. Pat. No. 6,547,489 wherein the stripping gas can be directed to some extent by providing a pneumatic screen and that the stripping gas can be prevented from spreading in random directions however this does not present a solution in situations where it is not possible to install a barrier along the full circumference of the contaminated area. Such a situation occurs where for example the soil to be remediated forms part of a larger contaminated area (for example if the contaminated soil extends over plots of land owned by different proprietors and not all plots are to be remediated at the same time), or if an impervious layer extending over a large area is present above the area to be cleaned up.

A further drawback of the known process is that in many cases it is not possible to apply the biologically active layer above the contaminant, for example if an impervious layer extending over a large area is present in or above the contaminated area.

The object of the invention is to provide a process for removing contaminants from soil that does not have, or virtually does not have, the aforementioned drawback.

This object is achieved by the process according to the invention. The process according to the invention is a process for removing contaminants from contaminated soil with the aid of a stripping gas and with a biologically active layer being present in or on the soil, which process comprises the following steps:

(a) creating in the soil a medium whose resistance is lower than the resistance of the surrounding soil, (b) injecting the stripping gas in the soil at the depth of and/or beneath the contaminants, (c) volatizing the contaminants with the stripping gas, whereupon the stripping gas with the contaminants largely flows to the biologically active layer via the medium whose resistance is lower than that of the surrounding soil.

The contaminant is converted within the biologically active layer, also sometimes referred to as the biological layer, or biolayer. In the context of the present invention, biologically active layer means a layer containing biologically active material. Biologically active material means a material that contains microorganisms whereby a contaminant can be decomposed or converted. The biologically active layer may be applied either continuously or discontinuously. With discontinuously is meant that the biologically active layer is applied discretely, i.e. in the form of discrete parts, together forming the biologically active layer. In one embodiment the biologically active layer is applied discontinuously. An example of a discontinuous layer is one comprising multiple trenches and/or holes, which trenches and/or holes may be the same or different in terms of shape and dimensions. The combination of number, length, width and depth of the trenches will normally be so chosen that an optimum process is established.

In the process according to the invention there is created in the soil a medium whose resistance is lower than the resistance of the surrounding soil. In the context of the present invention, the term soil includes an impervious layer, if present. Such impervious layer may be located in the contaminated soil, in the soil but above the contaminated soil or at or on the ground surface.

An advantage of the present process according to the invention is that the stripping gas with contaminants can be directed towards the place where a biological layer is present and/or where there is biological material even if it is not or not exactly located above the contaminated soil.

Another advantage of the process according to the invention is that contaminants at great depths can also be removed in situ. In the known processes whereby contaminants are converted in situ in a biologically active layer the stripping gas will, for remediation at great depth, need to rise to the surface through a thick layer of soil. Since the resistance increases with the thickness of the layer of soil, only little stripping gas will rise to the surface. If little stripping gas flows through the biologically active layer per unit time, the remediation will proceed only slowly. This problem cannot readily be resolved by injecting the stripping gas at a higher pressure because the soil may crack at high pressures and the stripping gas may rise through the cracks as a result of which contact with the biologically active layer and with the contaminant is not or not adequately established for satisfactorily converting the contaminants in the stripping gas.

Yet another advantage of the process according to the invention is that the stripping gas with contaminants does not or virtually does not come into contact with the soil between the contaminated soil and the biologically active layer. Contaminants can thus be prevented from remaining behind in soil layers that at commencement of the remediation process were free from the contaminants to be removed or that contained such contaminants in such concentration as not to require treatment.

Another advantage of the process according to the invention is that a discontinuous biologically active layer with a relatively small overall surface area suffices to clean up the contaminated soil, because the stripping gas with the contaminant is directed towards the biologically active layer as a result of the application of a medium whose resistance is lower than that of the surrounding area. Thus, it is no longer necessary to apply a biologically active layer extending over a wide area. A discontinuous layer is relatively easy to apply.

In an embodiment of the process according to the invention one or more pipes are installed, which pipes are gas pervious and contain the biologically active material.

In an embodiment of the process according to the invention the process is characterized in that the medium whose resistance is lower than the resistance of the surrounding soil is created between an area to be remediated, i.e. the contaminated soil, or part of the contaminated soil to be treated, and a biologically active layer not directly bordering thereon so as to create a short cut for the stripping gas comprising the volatilized contaminants. The medium will preferably be applied in a straight line between the area to be remediated and the biologically active layer. However, it is also possible to introduce one or more bends in the medium. The biologically active layer will usually be located on or directly at the ground surface whilst the contaminated soil is located directly underneath at greater depth, but this is no longer necessary in the process according to the invention because the stripping gas with the contaminants will flow to the biologically active layer via the medium whose resistance is lower than that of the surrounding soil.

A medium whose resistance is lower than the surrounding soil can be created in various ways. In a preferred embodiment of the process according to the invention the process is characterized in that the medium of which the resistance is lower than the resistance of the surrounding soil is created by targeted drying of certain areas in the soil. Thus, it is possible for example to dry out layer by layer to increasingly great depths the soil located beneath a biologically active layer with the aid of a gas that is injected at the desired depth until the whole soil column located above the contaminated soil has adequately dried and to subsequently clean up the underlying contaminated soil by injecting the stripping gas therein. The soil has adequately dried out when the resistance is so low that all or virtually all the stripping gas with the volatized contaminants rises through the dried soil to the biologically active layer. The drying of the soil is preferably carried out with the same gas as the gas that is used as stripping gas and may also be effected with the aid of injection lances that may also be utilized for injecting the stripping gas.

Air is preferably used as stripping gas. In the process according to the invention, the stripping gas is preferably injected at a pressure of at least 1.3 bar, the stripping gas is more preferably injected at a pressure higher than 2 bar in order for the soil to dry more rapidly. The stripping gas is usually injected at a pressure not higher than 8 bar.

The use of air that is injected at increased pressure decreases the relative air humidity and accelerates the drying process.

In an embodiment of the process according to the invention the process is characterized in that the medium whose resistance is lower than the resistance of the surrounding soil is created by installing at least one hollow pipe, which may or may not be completely or partly filled with material that presents a lower resistance to the stripping gas than the surrounding soil such as for example sand, gravel or biologically active material. By installing a pipe between the contaminated soil and the biologically active layer there is created a medium with very low air resistance. The stripping gas will preferably flow through the hollow pipe to the biologically active layer. One or more pipes may be installed depending on the extent and shape of the contaminated area, and the pipes may vary in length and diameter. The parts of the pipe that are located in the contaminated soil or in the biolayer may also be provided with perforations.

In an embodiment the process according to the invention is characterized in that the medium whose resistance is lower than the resistance of the surrounding soil is formed by creating a space, for example by drilling at least one hole and optionally filling that hole completely or partly with material that presents a lower resistance to the stripping gas than the surrounding soil such as for example sand, gravel or biologically active material. The upper end of the hole is preferably sealed gastight so that the stripping gas with the contaminants can only rise to the surface via the biologically active layer. However, it is also possible to apply biologically active material in the space so that the space is admittedly not sealed gas-tight but the stripping gas with the contaminants will for the most part flow through the biologically active layer before it reaches the surface.

In a preferred embodiment of the process according to the invention, the material that is present in the medium whose resistance is lower than the resistance of the surrounding soil also contains biologically active material.

In a preferred embodiment of the process according to the invention a medium with a low resistance is applied in an impermeable layer at the ground surface in such a way that the gas with the contaminants can flow through the impermeable layer to the biologically active layer. By creating a medium whose resistance is lower than the resistance of the surrounding soil under the impermeable layer the stripping gas will have a different flow pattern and hence, will allow remediation of contaminated soil in areas where without the placement of a medium whose resistance is lower than the resistance of the surrounding soil such remediation would not be achieved. Normal practice will be not to create a single medium with reduced resistance in an impervious layer but to reduce the resistance in a number of locations. In an embodiment of the process according to the invention one or more pipes, also known as injection lances, are installed in a gas impermeable layer, which pipes are gas permeable and contain the biologically active material. With such pipes a medium with reduced resistance is created and at the same time a discontinuous, biologically active layer is applied. Pipes wherein the two functions, that of reduction of resistance and biological activity, are combined are henceforth referred to as pre-loaded filters. Besides biologically active material the pipes may also contain activated carbon.

BRIEF DESCRIPTION OF THE DRAWINGS

FIG. 1*a* schematically illustrates the flow of stripping gas injected into the ground for a process according to the prior art in which a medium whose resistance is lower than the resistance of the surrounding soil is not present under an impermeable layer, and FIG. 1*b* schematically illustrates a process according to the invention in which a medium whose resistance is lower than the resistance of the surrounding soil is present under an impermeable layer.

DETAILED DESCRIPTION

FIG. 1*b* illustrates that by creating a medium whose resistance is lower than the resistance of the surrounding soil, which medium in FIG. 1*b* is called "air guiding layer" under the impermeable layer the stripping gas will have a different flow pattern and will flow through a larger area of soil, and hence, will allow remediation of contaminated soil in areas where without the placement of a medium whose resistance is lower than the resistance of the surrounding soil such remediation would not be achieved.

In a process for removing contaminants from soil with the aid of a stripping gas, in which process a medium is created whose resistance is lower than the resistance of the surrounding soil and wherein the stripping gas is injected at the depth of or beneath the contaminant as a result of which the contaminant with the stripping gas is volatized and subsequently rises to the surface via the medium whose resistance is lower than the surrounding soil it is also possible to apply in or at the ground surface a layer that contains either activated carbon or both biological material and activated carbon. Pre-loaded filters are particularly suitable for applying activated carbon and/or biologically active material.

An advantage of the process according to the invention is that it can be applied while construction takes place on the surface above the contaminated soil, and that it can also be used after construction has taken place.

In areas where the soil is susceptible to subsidence and hence not stable enough to allow construction of e.g. buildings or roads that will remain stable over time, poles which rest on sub surface layers which provide the desired stability are often used to build the foundation on. Typically, foundations resting on poles are made of concrete. By placing a foundation a space is created between the ground surface and the underside of the foundation. In the process according to the invention, such a space, if present, is used as the medium where the resistance of the soil is lower than the resistance in the surrounding soil. In an embodiment, a biologically active layer is created on one or more sides of the foundation, with a depth that ensures there is direct contact between the space beneath the foundation and the biologically active layer. Subsequently a gas, usually air, is injected in or underneath the contaminated soil. Because the space present under the foundation is a medium whose resistance is lower than that of the surrounding soil, the gas will preferentially flow to that space (see also FIG. 1b for illustration for the gas flow pattern), and after passing through said space will flow to the biologically active layer. Thus, using the space that is created under a foundation resting on poles allows the process according to the invention to be carried out after construction has taken place.

In areas where the soil is stable enough to allow construction so-called shallow foundations are typically used. Under this type of foundation there is no space available that can be used as the medium where the resistance of the soil is lower than the resistance in the surrounding soil. In an embodiment of the process according to the invention, this problem is solved by installing a mat in or on the ground prior to laying the foundation, which mat is gas permeable and has a low resistance and yet is strong enough to allow construction on top of it. Such mats are known in the construction of for example dams where they serve to prevent erosion. The use in remediation projects, however, is novel and is nowhere taught or suggested. Examples of commercially available materials that can be used in the process according to the invention are Enkamat® or Enkadrain®, from Colbond Geosynthetics, in The Netherlands. However, any product that is strong enough to allow construction on top of it which construction will over time remain stable and that has a resistance to gas lower than the soil underneath it, is suitable to be used in this embodiment of the invention. To ensure that the gas containing the contamination flows toward the biologically active layer, the upper surface and if desirable also the one or more sides of the mat must be sealed with an impermeable material, or at least with a material that presents such a high resistance to the gas that the gas will flow in the desired direction, which is towards the biologically active layer that has been placed adjacent to the mat on at least one side of the mat.

Biologically active layers typically are not solid enough to allow any type of heavy construction, e.g. buildings or roads, on top of it. By using a mat as described above, which mat on its upper surface is gas impermeable or is covered by a gas impermeable material, a road can for example be constructed on top of the mat, and contaminants present in the soil under the mat may still be removed by the process according to the invention, if the sides of the mat are either sealed or in contact with the biologically active layer.

A special problem is the decontamination of a slope. It is hard to reliably use a biologically active layer in a slope e.g. because as the result of wind erosion the biologically active layer is reduced in thickness, or because the slope is intended to reinforce a dam applying a biologically active layer in the slope would weaken the slope. However, by placing a mat as described above in the slope, and placing biologically active material in the slope in direct contact with the upper edge the mat, contaminants present in the stripping gas can be converted by biologically active material in a slope, without affecting the slope in a way that is detrimental to its purpose.

A different process for removing a contaminant from soil with the aid of a stripping gas and with a biologically active layer being present in or on the soil is one wherein in a first step a biologically active layer is placed in or on the soil and in a second step a mat is placed on top of the biologically active layer, which mat has a high porosity, and which mats' upper surface has been made impermeable, e.g. by placing an impermeable top sheet over the mat. This embodiment presents a cost effective process for removing both aerobically removable contaminants such as aromatic compounds and contaminants that are not aerobically convertible, such as chlorinated products. In known processes, this combination of contaminants is removed by the use of a combination of injection of a stripping gas and extraction of air from the soil. This combination of techniques is very expensive. By using the mat, the stripping gas containing both types of contaminant will first pass the biologically active layer, whereby the aerobically convertible contaminant is at least partially converted, and then collected in the open space of the porous mat present on top of the mat. By sealing the sides of the mat, except for one of more exit points, one or more pumps can easily be connected and used to pump the gas which contains the contaminant that cannot be converted aerobically to e.g. a filter containing activated carbon. Thus, the mat allows easy collection of gas over the whole surface of the biologically active layer, and from there, easy transport to any desired storage tank or purification unit.

The invention claimed is:

1. Process for removing contaminants from contaminated soil with the aid of a stripping gas and with a biologically active layer being present in or on the soil, wherein the soil is provided with an impermeable layer at a surface of the soil which extends to the biologically active layer, and wherein the process comprises:
   (a) creating an air guiding layer in the surface of the soil subjacent to the impermeable layer, wherein the air guiding layer extends to the biologically active layer and includes a medium whose resistance is lower than the resistance of surrounding soil which lacks the medium,
   (b) injecting the stripping gas in the soil below the air guiding and impermeable layers and at least at a depth of the contaminants or below,
   (c) volatilising the contaminants with the stripping gas, and
   (d) allowing the stripping gas with the contaminants substantially to flow to the biologically active layer at the surface of the soil via the air guiding layer having the medium whose resistance is lower than that of the surrounding soil.

2. Process according to claim 1, wherein the medium whose resistance is lower than the resistance of the surrounding soil is created between an area to be remediated and a biologically active layer not directly bordering thereon.

3. Process according to claim 1, wherein the medium whose resistance is lower than the resistance of the surrounding soil is created by targeted drying of certain areas in the soil.

4. Process according to claim 1, wherein the stripping gas is injected at a pressure of at least 1.3 bar.

5. Process according to claim 1, wherein the stripping gas is injected at a pressure of between 2 and 8 bar.

6. Process according to claim 1, wherein the medium whose resistance is lower than the resistance of the surrounding soil is created by installing at least one hollow pipe between the biologically active layer and the contaminated soil.

7. Process according to claim 1, wherein the medium whose resistance is lower than the resistance of the surrounding soil consists of a space which may or may not be filled with a material that presents a lower resistance to the stripping gas than the surrounding soil.

8. Process according to claim 1, wherein the medium whose resistance is lower than the resistance of the surrounding soil comprises biologically active material and/or activated carbon.

9. A process for removing contaminants from contaminated soil which comprises:
   (a) providing at least one biologically active region in the soil and an impermeable layer at a surface of the soil adjacent to the at least one biologically active region;
   (c) creating an air guiding layer at the surface of the soil subjacent to the impermeable layer which extends to the biologically active layer by providing a medium in the air guiding layer whose resistance is lower than the resistance of the surrounding soil which lacks the medium;
   (d) injecting a stripping gas into the soil at least at a depth of the contaminants therein or below;
   (c) volatilising the contaminants with the stripping gas; and
   (d) allowing the stripping gas with the volatilised contaminants therein substantially to flow to the biologically active layer in the soil adjacent the impermeable layer via the air guiding layer subjacent the impermeable layer.

10. The process of claim 9, wherein the medium in the guiding layer comprises sand and/or gravel.

11. The process of claim 9, wherein the medium in the guiding layer comprises a dried region of the soil.

12. The process of any one of claims 9-11, wherein the guiding layer comprises a biologically active material.

* * * * *